US012806742B2

(12) United States Patent
Busenitz

(10) Patent No.: US 12,806,742 B2
(45) Date of Patent: Nov. 24, 2026

(54) GRIPPING DEVICE

(71) Applicant: Honeywell Federal Manufacturing & Technologies, LLC, Kansas City, MO (US)

(72) Inventor: Clark Andrew Busenitz, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 967 days.

(21) Appl. No.: 18/079,530

(22) Filed: Dec. 12, 2022

(65) Prior Publication Data

US 2023/0182267 A1 Jun. 15, 2023

Related U.S. Application Data

(60) Provisional application No. 63/288,790, filed on Dec. 13, 2021.

(51) Int. Cl.
*B25B 9/02* (2006.01)

(52) U.S. Cl.
CPC .................................... *B25B 9/02* (2013.01)

(58) Field of Classification Search
CPC .. A61B 17/30; B25B 9/04; B25B 9/00; B25B 9/02
USPC .......................................................... 606/210
See application file for complete search history.

(56) References Cited

U.S. PATENT DOCUMENTS 420,125 A * 1/1890 Swain ........................ B25B 9/02 294/99.2
1,522,398 A * 1/1925 Viol .......................... B25B 9/02 81/452
2,157,226 A * 5/1939 Betz .......................... B25B 9/02 294/99.2
2,199,456 A * 5/1940 Betz .......................... B25B 9/02 294/99.2

(Continued)

FOREIGN PATENT DOCUMENTS

CN 103170927 6/2013
CN 105662536 6/2016

(Continued)

OTHER PUBLICATIONS

Starfrit, Starfrit Silicone and Stainless Steel Extendable Tongs, Red, Jun. 10, 2013, Website: <https://www.amazon.ca/Starfrit-Silicone-Stainless-Steel-Extendable/dp/B00D6CMURU>.

(Continued)

*Primary Examiner* — Bao-Thieu L Nguyen
(74) *Attorney, Agent, or Firm* — Hovey Williams LLP

(57) ABSTRACT

A gripping device comprises a first arm, a second arm, and a tip. The second arm opposes at least a portion of the first arm and has a proximal end and a distal end operable to shift toward the first arm. The tip is shiftably coupled to the distal end of the second arm so that the tip is operable to longitudinally shift between a retracted position in which the tip is relatively closer to the proximal end of the second arm and an extended position in which the tip is relatively farther from the proximal end of the second arm. The tip enables a user to engage an object and shift so that the object can be rotated while held by the gripping device.

20 Claims, 10 Drawing Sheets

(56) References Cited

U.S. PATENT DOCUMENTS

| | | | | | |
|---|---|---|---|---|---|
| 2,406,393 | A * | 8/1946 | Neugass | A61B 17/30 | 294/99.2 |
| 3,818,784 | A * | 6/1974 | McClure | B25B 9/02 | 294/99.2 |
| 3,844,291 | A | 10/1974 | Moen | | |
| 5,047,046 | A * | 9/1991 | Bodoia | A61B 17/30 | 606/205 |
| 5,334,215 | A * | 8/1994 | Chen | A61B 17/30 | 294/99.2 |
| 5,740,611 | A * | 4/1998 | Schloss | B25B 9/02 | 30/29.5 |
| 5,899,513 | A * | 5/1999 | Grisoni | A61B 17/30 | 294/99.2 |
| 6,988,814 | B1 * | 1/2006 | Correa | B25B 9/02 | 362/184 |
| 7,884,326 | B2 | 2/2011 | van de Water et al. | | |
| 8,973,958 | B2 | 3/2015 | Demers et al. | | |
| 9,445,863 | B2 | 9/2016 | Batchelor et al. | | |
| 10,085,793 | B2 | 10/2018 | Batchelor | | |
| 2004/0145200 | A1 * | 7/2004 | Cho | A61B 17/30 | 294/99.2 |
| 2004/0145201 | A1 * | 7/2004 | Cho | B25B 9/02 | 294/99.2 |
| 2005/0063177 | A1 * | 3/2005 | Correa | B25B 9/02 | 362/109 |
| 2006/0028040 | A1 * | 2/2006 | Cohen | B25B 9/02 | 294/99.2 |
| 2007/0197066 | A1 * | 8/2007 | Chang | B26B 27/007 | 439/136 |
| 2009/0030448 | A1 * | 1/2009 | Andre | A61B 17/30 | 606/205 |
| 2009/0240281 | A1 * | 9/2009 | Andre | B25B 9/02 | 29/527.4 |
| 2010/0298865 | A1 * | 11/2010 | Aufaure | A61B 17/30 | 606/210 |
| 2012/0126556 | A1 * | 5/2012 | Wu | B25B 9/02 | 294/99.2 |
| 2015/0148840 | A1 * | 5/2015 | Francis | A45D 26/0066 | 606/210 |
| 2021/0393084 | A1 * | 12/2021 | Henry | A47J 45/10 | |
| 2022/0202434 | A1 * | 6/2022 | Arshava | A61B 17/30 | |

FOREIGN PATENT DOCUMENTS

| | | |
|---|---|---|
| CN | 205758713 | 12/2016 |
| DE | 10005637 | 9/2000 |

OTHER PUBLICATIONS

Bostelman, Roger et al.; Survey of Industrial Manipulation Technologies for Autonomous Assembly Applications; Article; pp. 63; Dated: Feb. 29, 2012.

* cited by examiner

GRIPPING DEVICE

RELATED APPLICATIONS

The present application is a non-provisional application and claims priority of U.S. Provisional Application No. 63/288,790 filed on Dec. 13, 2021, and entitled "GRIPPING DEVICE", which is hereby incorporated in its entirety by reference herein.

STATEMENT REGARDING FEDERALLY-SPONSORED RESEARCH OR DEVELOPMENT

This invention was made with Government support under Contract No.: DE-NA-0002839 awarded by the United States Department of Energy/National Nuclear Security Administration. The Government has certain rights in the invention.

BACKGROUND

Gripping devices such as tweezers are often used to view, manipulate, and hold small objects. However, to view all sides of an object, such as a cylindrical object, a user often must either manipulate the tweezers or set an object down and re-grip it at a different orientation. This is cumbersome and often results in dropping the object. Further, some objects are best gripped in only a single orientation. And often times when coating/painting an object, setting the object down is not practical and could affect the quality of the coating.

The background discussion is intended to provide information related to the present invention which is not necessarily prior art.

SUMMARY OF THE INVENTION

The present invention solves the above-described problems and other problems by providing a gripping device that enables rotation of an object while maintaining hold of the object.

A gripping device constructed according to an embodiment of the present invention comprises a first arm, a second arm, and a tip. The second arm opposes at least a portion of the first arm and has a proximal end and a distal end operable to shift toward the first arm.

The tip is shiftably coupled to the distal end of the second arm so that the tip is operable to longitudinally shift between a retracted position in which the tip is relatively closer to the proximal end of the second arm and an extended position in which the tip is relatively farther from the proximal end of the second arm. The tip enables a user to engage an object and shift so that the object can be rotated while held by the gripping device.

A gripping device constructed according to another embodiment of the present invention comprises a first arm, a second arm, a first tip, and a second tip. The first arm has a proximal end and a distal end. The second arm has a proximal end and a distal end. The proximal end of the second arm is fixed relative to the proximal end of the first arm. The distal end of the second arm is spaced apart from and opposing the distal end of the first arm. The distal end of the first and second arms re operable to shift toward one another. The first tip is shiftably coupled to the distal end of the first arm so that the first tip is operable to longitudinally shift between a retracted position in which the first tip is relatively closer to the proximal end of the first arm and an extended position in which the first tip is relatively farther from the proximal end of the first arm. The second tip is shiftably coupled to the distal end of the second arm so that the second tip is operable to longitudinally shift between a retracted position in which the second tip is relatively closer to the proximal end of the second arm and an extended position in which the second tip is relatively farther from the proximal end of the second arm.

A gripping device constructed according to another embodiment of the present invention comprises a first arm, a second arm, a third arm, and a tip. The first arm has a proximal end and a distal end. The second arm opposes the first arm, and the distal end of the first arm is operable to shift toward the second arm. The third arm opposes the second arm. The tip is coupled to the distal end of the first arm so that the tip is operable to longitudinally shift between a retracted position in which the tip is relatively closer to the proximal end of the first arm and an extended position in which the tip is relatively farther from the proximal end of the first arm.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
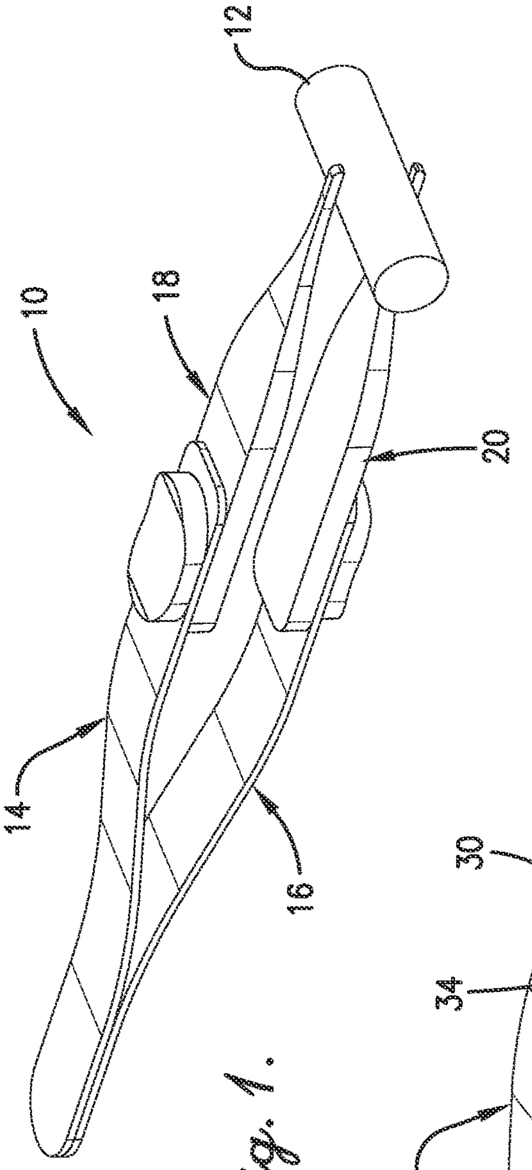
FIG. 1 is a perspective view of a gripping device constructed in accordance with embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning to FIG. 1, a gripping device 10 constructed in accordance with an embodiment of the invention is illustrated. The illustrated gripping device 10 operates similar to a pair of tweezers biased in an open position but can operate in other manners without departing from the scope of the present invention. For example, the gripping device 10 may be biased in a closed, gripping position. The gripping device 10 is operable to engage an object 12 and rotate the object 12 while maintain the grip on the object 12. The gripping device 10 comprises a pair of opposing arms 14, 16 and a pair of corresponding tips 18, 20 movably attached to the opposing arms 14, 16.

Figure 2:
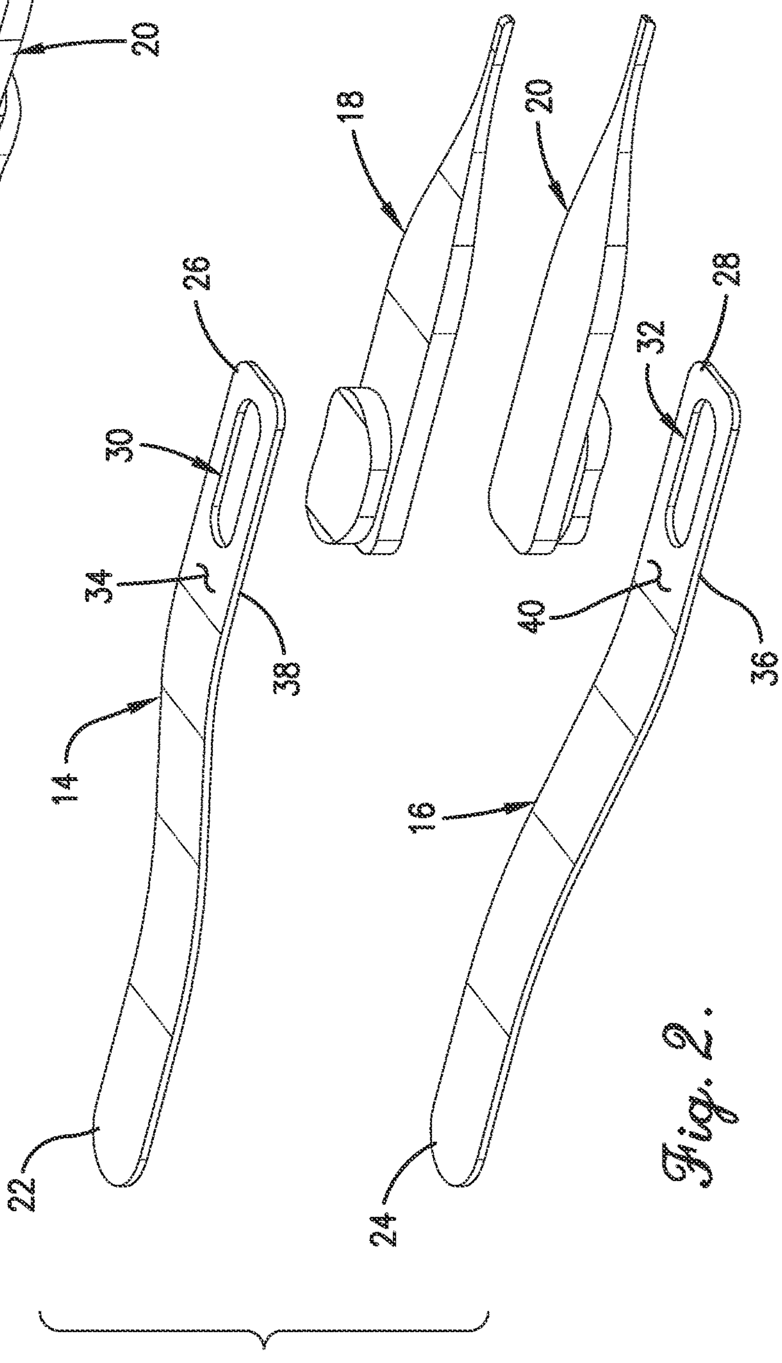
FIG. 2 is an exploded view of the gripping device of FIG. 1.

Turning to FIG. 2, the opposing arms 14, 16 each comprise a proximal end 22, 24, a distal end 26, 28, and slots 30, 32 for receiving portions of the tips 18, 20. The opposing arms 14, 16 may be connected to one another at their proximal ends 22, 24 and may be shaped so that their distal ends 26, 28 are biased at spaced apart positions relative to one another to present a gap between them. The opposing arms 14, 16 may be made of resilient material, such as metal, plastic, or the like. However, the opposing arms 14, 16 may be biased so that the distal ends 26, 28 are at any position, including proximal to one another, or in contact with one another, without departing from the scope of the present invention. Further, while the depicted arms 14, 16 are biased via their shape and resiliency, they may be biased any number of ways without departing from the scope of the present invention. For example, a biasing element, such as a spring or the like, may be used to bias the arms 14, 16.

The slots 30, 32 are formed longitudinally between the proximal ends 22, 24 and the distal ends 26, 28. The slots 30, 32 may be formed so that they extend from outer surfaces 34, 36 to inner surfaces 38, 40 of the arms 14, 16.

Figure 3:
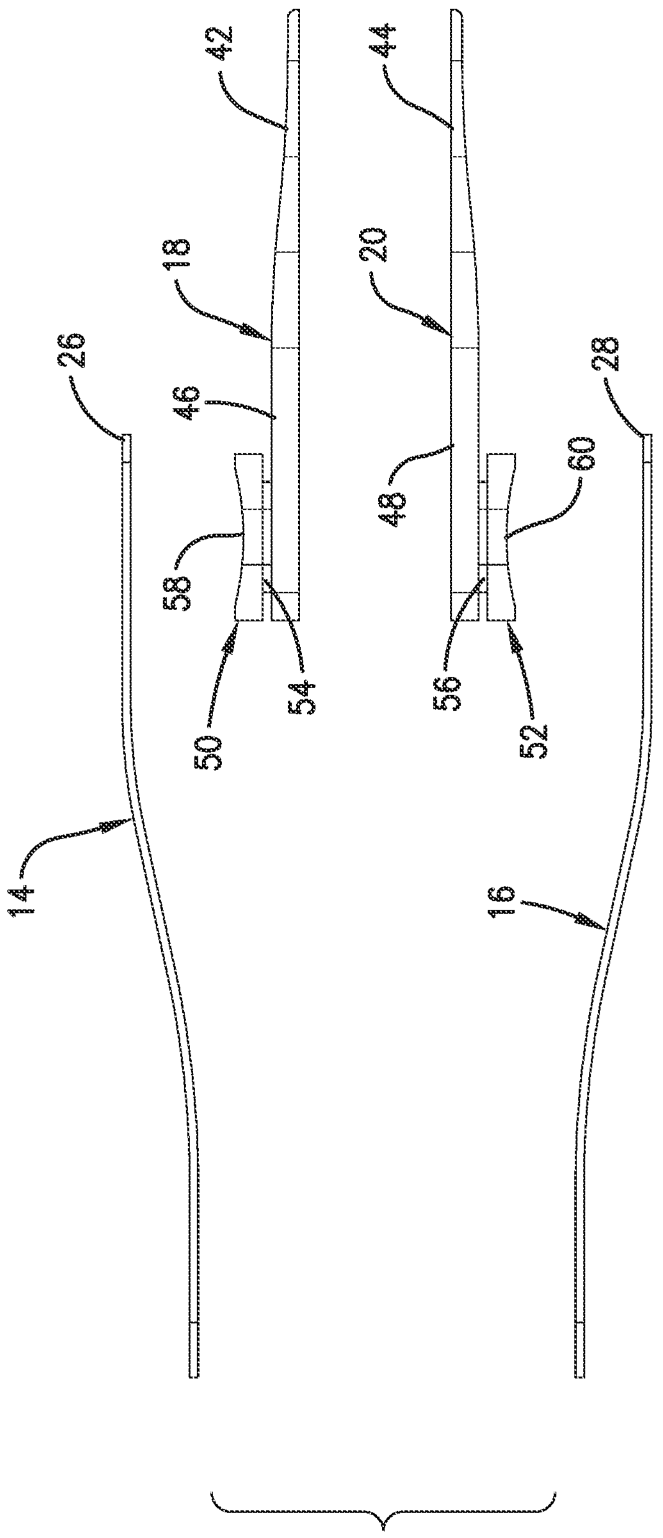
FIG. 3 is a side exploded view of the gripping device of FIG. 1.

Turning to FIG. 3, the tips 18, 20 are movably connected to the distal ends 26, 28 of the arms 14, 16 and longitudinally shiftable relative to the distal ends 26, 28 between retracted positions in which the tips 18, 20 are relatively closer to the distal ends 26, 28 and extended positions in which the tips 18, 20 are relatively farther from the distal ends 26, 28. The tips 18, 20 comprise jaw portions 42, 44, attachments portions 46, 48, and tabs 50, 52. The tips 18, 20 may be made of resilient material, such as metal, plastic, or the like. In one or more embodiments, the tips 18, 20 are made of different material than the opposing arms 14, 16. The jaw portions 42, 44 grip the object and extend past the distal ends 26, 28 of the arms 14, 16 to which they are respectively attached.

The attachment portions 46, 48 include protruding members 54, 56, or other protrusions/connecting structures, that extend into the slots (depicted in FIG. 2) of their respective arms 14, 16 and connect the attachment portions 46, 48 to the tabs 50, 52. The protruding members 54, 56 are operable to move within the slots 30, 32. As shown, the protruding members 54, 56 may be elongated connecting structures with widths that are substantially similar to the widths of the slots and lengths that are shorter than the lengths of the slots. The tabs 50, 52 and attachment portions 46, 48 may be wider than the widths of the slots to keep the protruding members 54, 56 within the slots 30, 32. In some embodiments, the height of the protruding members 54, 56 may be substantially the same as the thickness of the arms 14, 16. The tabs 50, 52 may include concave gripping surfaces 58, 60 which help a user securely hold and slide the tabs 50, 52.

Figure 4A:
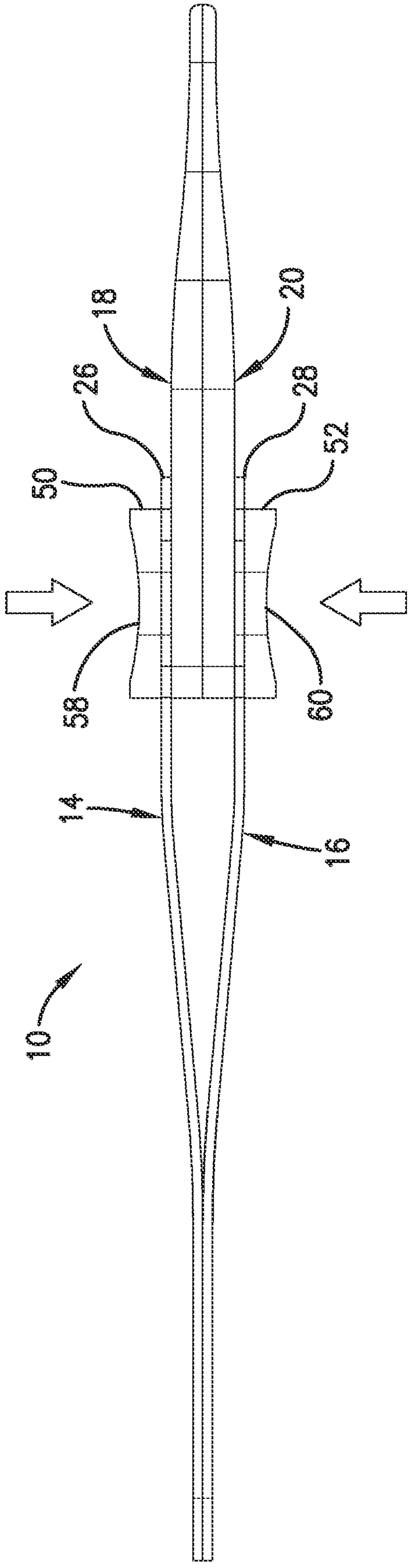
FIG. 4A is a side view of the gripping device of FIG. 1 with its tips at an engaged position.
Figure 4B:
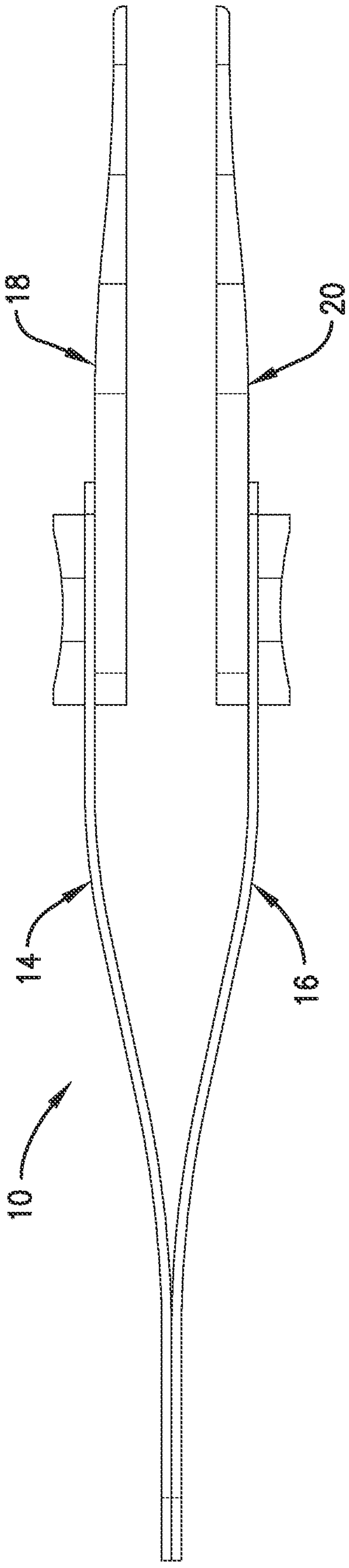
FIG. 4B is a side view of the gripping device of FIG. 1 with its tips at an open position.

Turning to FIGS. 4A and 4B, the arms 14, 16 may be shiftable relative to one another and biased in the position depicted in FIG. 4B. As shown in FIG. 4A, when forces (indicated by the arrows) are applied to the gripping surfaces 58, 60 of the tips 18, 20, the tabs 50, 52 press against the distal ends 26, 28 of the arms 14, 16 so that the gripping device 10 is in its squeezing or engaging position for holding an object.

Figure 4C:
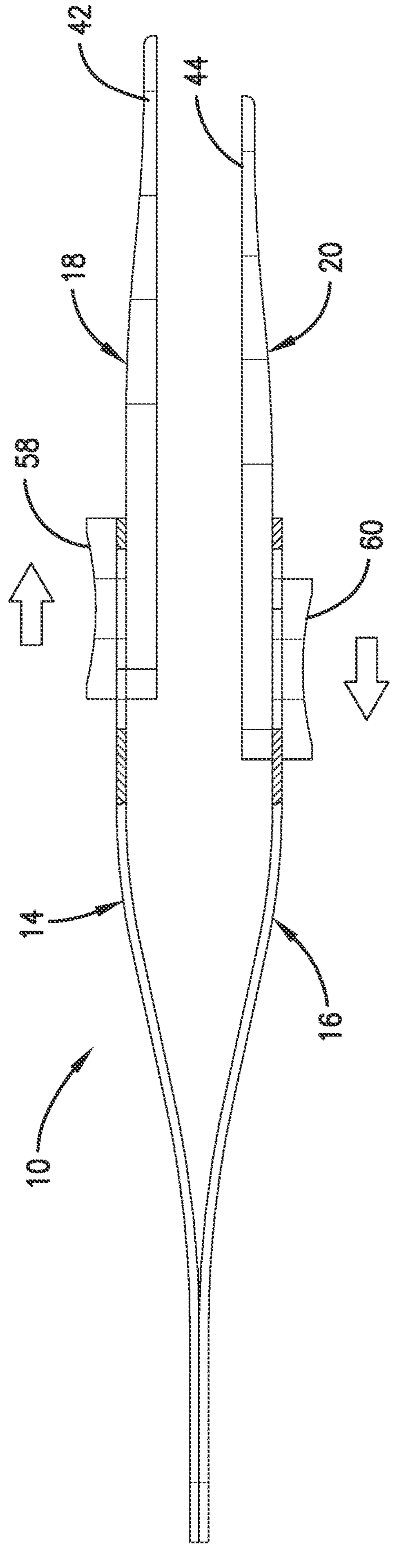
FIG. 4C is a side view of the gripping device of FIG. 1 with an upper tip in an extended position and a lower tip in a retracted position.
Figure 4D:
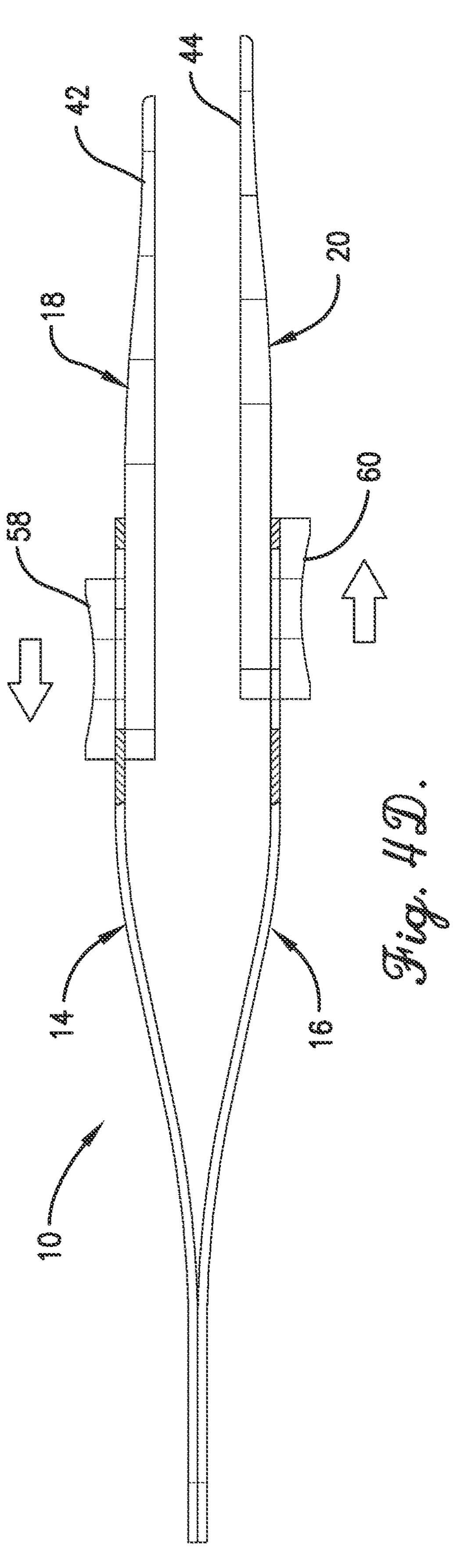
FIG. 4D is a side view of the gripping device of FIG. 1 with an upper tip in a retracted position and a lower tip in an extended position.

Turning to FIGS. 4C and 4D, when pressure is applied to the gripping surfaces 58, 60 in a direction substantially parallel with the longitudinal lengths of the arms 14, 16 (indicated by the arrows), the tips 18, 20 shift relative to the arms 14, 16. The tips 18, 20 may be operable to shift so that their jaw portions 42, 44 are relatively farther away from the distal ends 26, 28 of the arms 14, 16. The tips 18, 20 may be operable to also shift so that their jaw portions 42, 44 are relatively closer to the distal ends 26, 28 of the arms 14, 16. Further, each tip 18, 20 is configured to shift independently of the other tip 18, 20.

A gripping device 10A constructed in accordance with another embodiment of the invention is shown in FIGS. 5-12. The gripping device 10A may comprise substantially similar components as gripping device 10; thus, the components of gripping device 10A that correspond to similar components in gripping device 10 have an 'A' appended to their reference numerals. The principal difference between gripping device 10A and gripping device 10 is that the gripping device 10A comprises third and fourth arms 17A, 19A biased in a closed position relative to arm 16A to enable an object 12A to be gripped between the second arm 16A and the third and fourth arms 17A, 19A and rotated by arm 14A.

Figure 5:
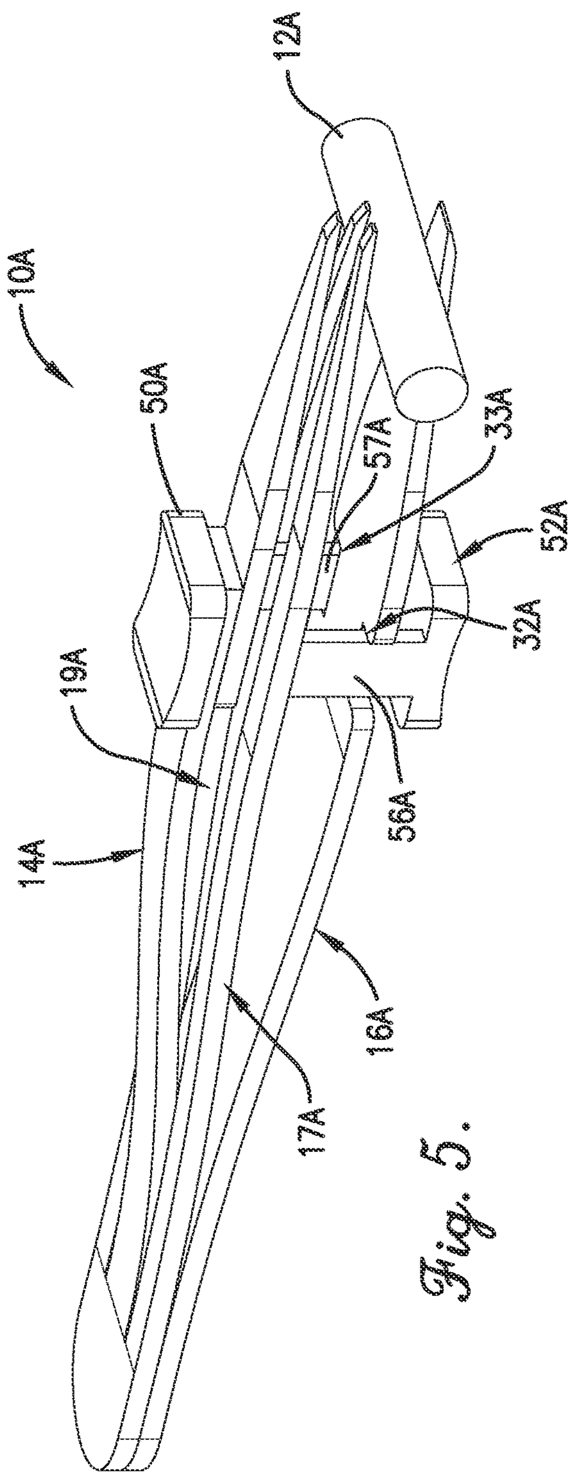
FIG. 5 is a perspective view of a gripping device constructed in accordance with another embodiment of the present invention.
Figure 6:
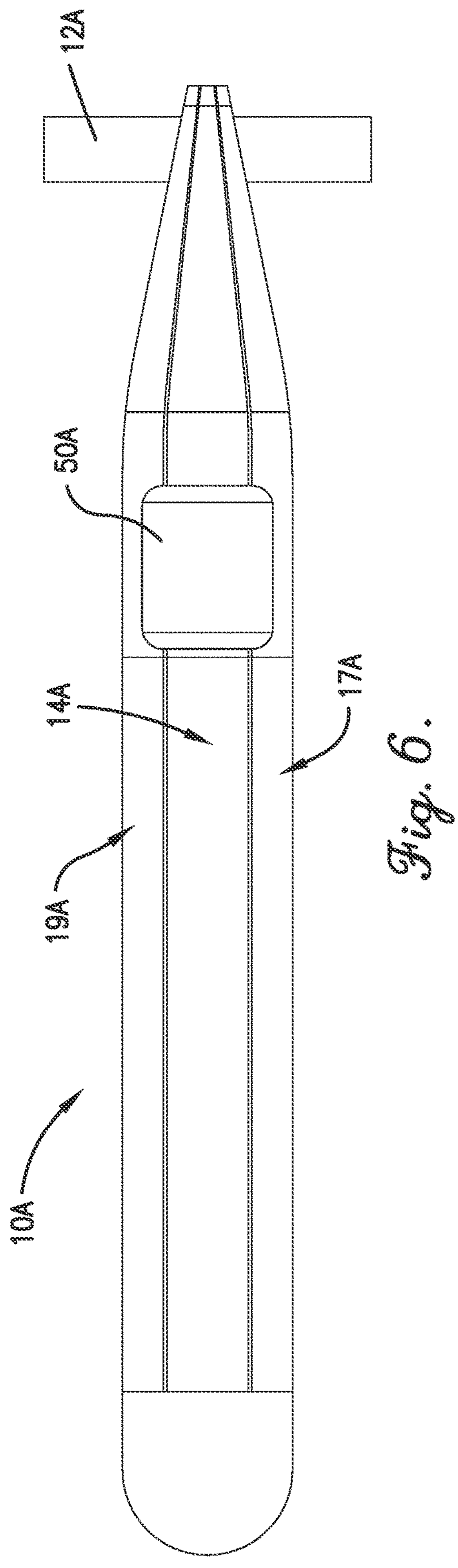
FIG. 6 is a top plan view of the gripping device of FIG. 5 engaging an object at a first position.

Turning to FIGS. 5 and 6, the third and fourth arms 17A, 19A may be laterally spaced apart from one another so that the first arm 14A can move between them. The tab 52A is attached to the third and fourth arms 17A, 19A instead of arm 16A so that the tab 52A is operable to push the third and fourth arms 17A, 19A from their closed positions. The tab 52A may include a pair of protruding members 56A, 57A that extend through slots 32A, 33A of arm 16A and attach to the third and fourth arms 17A, 19A.

Figure 7:
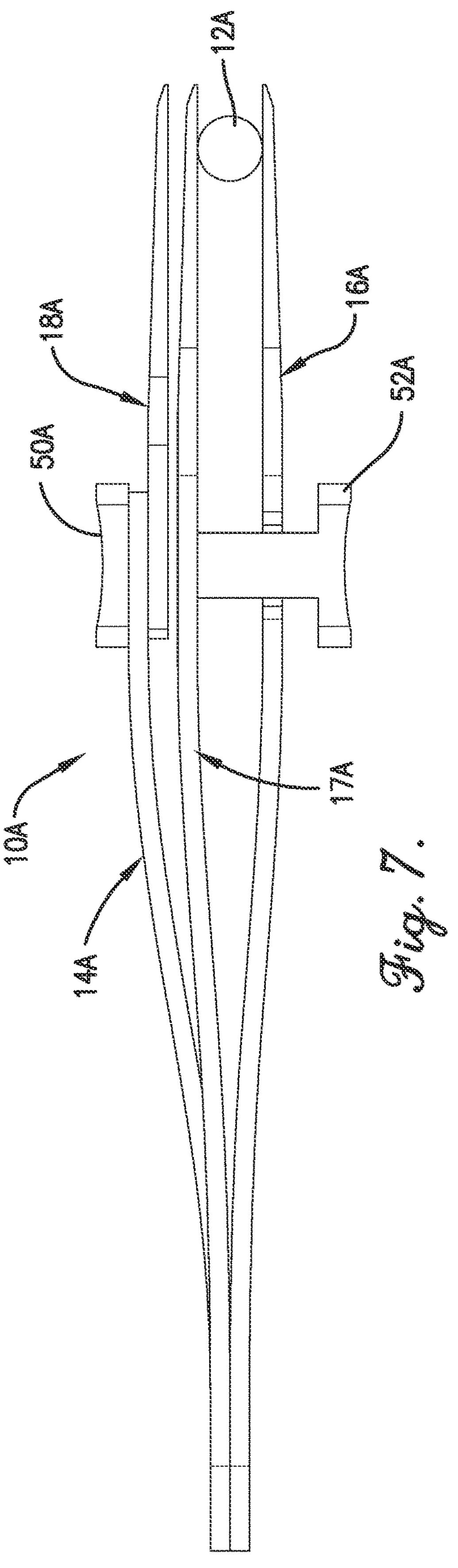
FIG. 7 is a side perspective view of the gripping device of FIG. 5 engaging the object at the first position.
Figure 8:
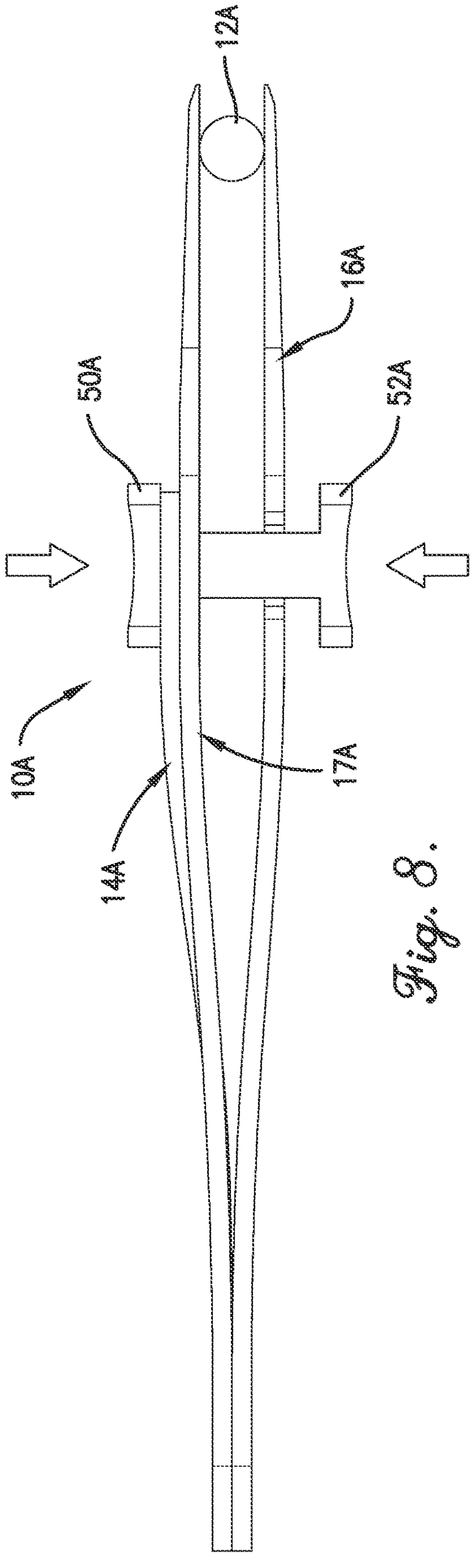
FIG. 8 is a side perspective view of the gripping device of FIG. 5 with another arm engaging the object at the first position.
Figure 9A:
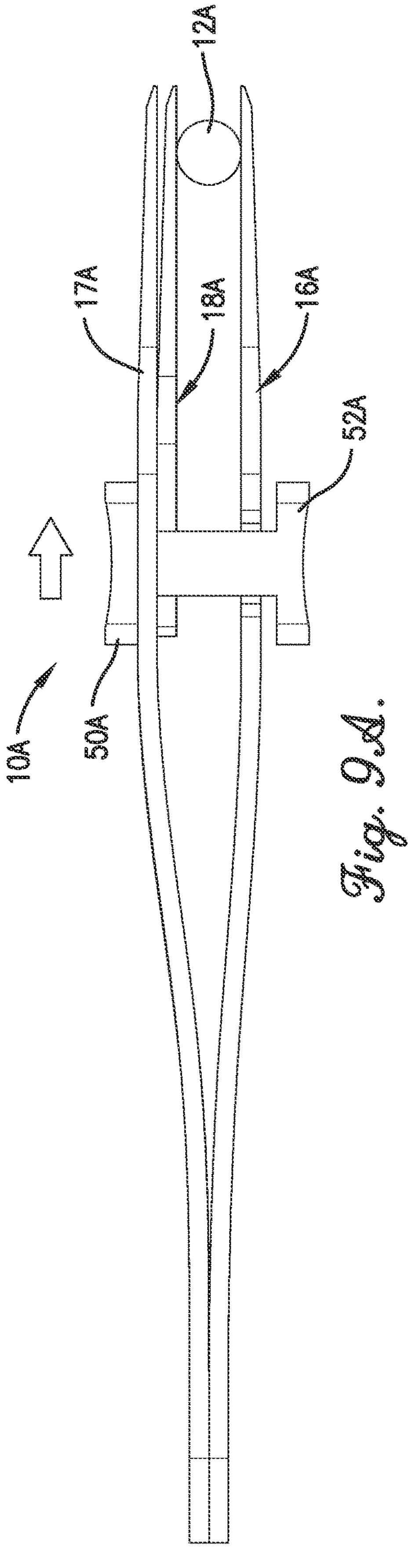
FIG. 9A is a side view of the gripping device of FIG. 5 with one or more of the arms disengaging the object.
Figure 9B:
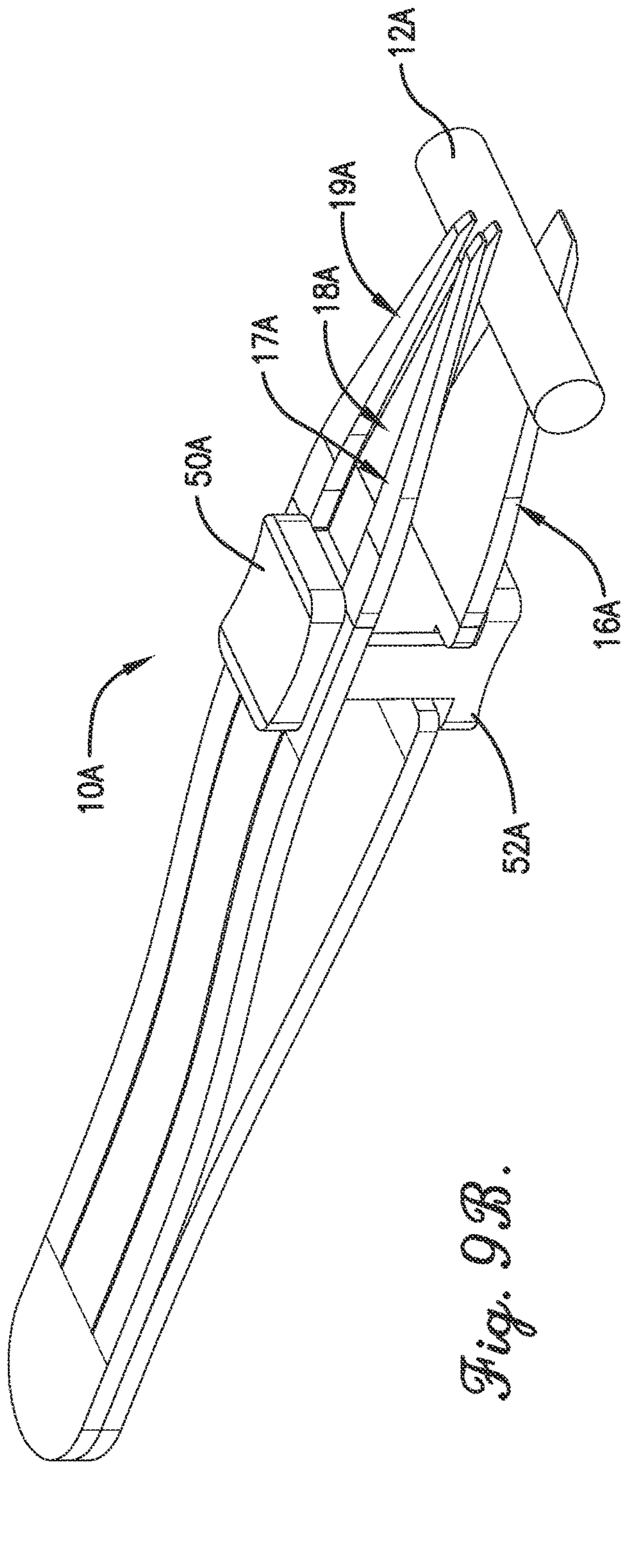
FIG. 9B is a perspective view of the gripping device of FIG. 5 with one or more of the arms disengaging the object.
Figure 10A:
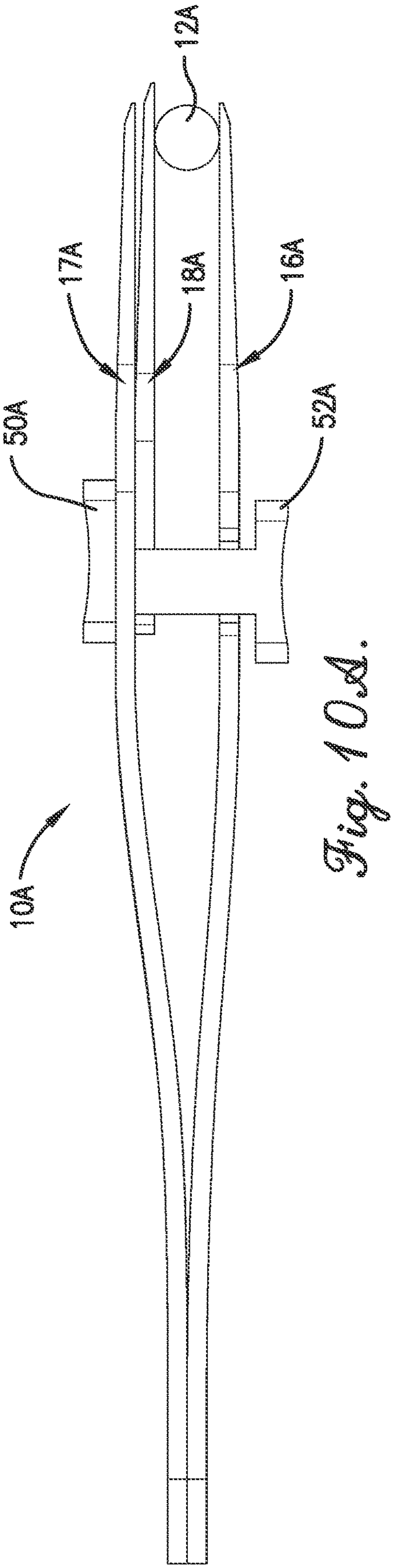
FIG. 10A is a side perspective view of the gripping device of FIG. 5 with one or more of the arms rotating the object to a second position.
Figure 10B:
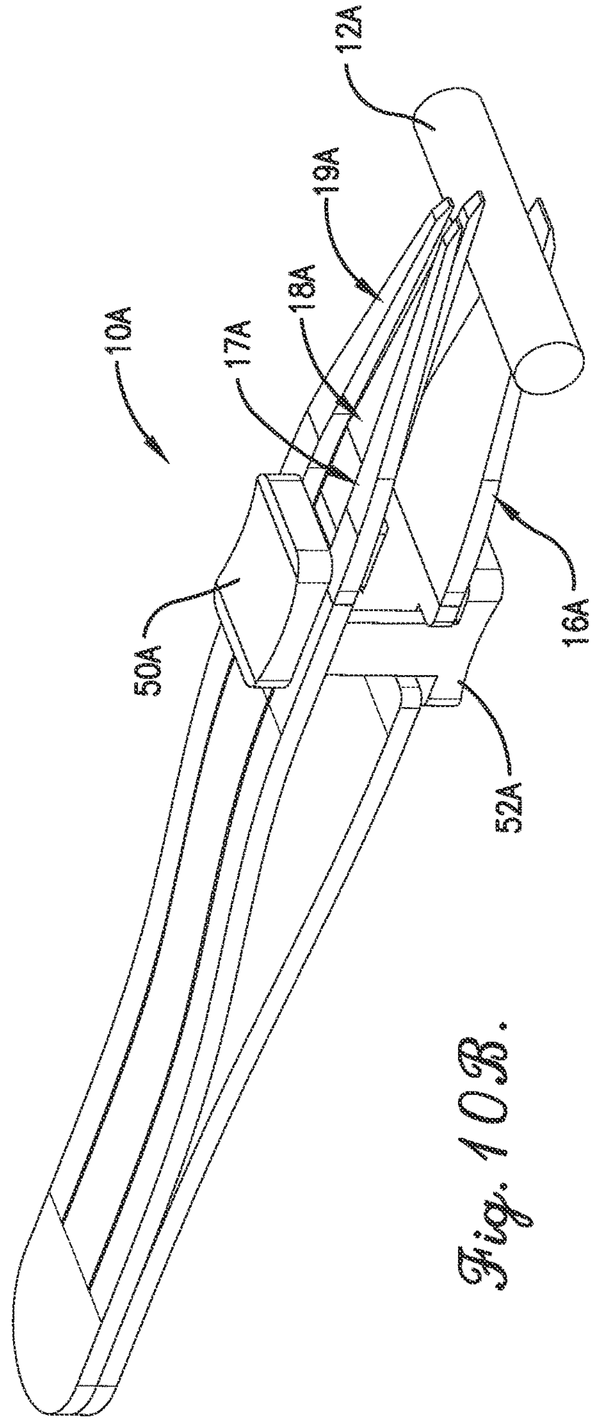
FIG. 10B is a perspective view of the gripping device of FIG. 5 with one or more of the arms rotating the object to a second position.

Turning to FIG. 7, the object 12A may be gripped between the third and fourth arms 17A, 19A and the arm 16A. The object 12A may be gripped due to the third and fourth arms 17A, 19A being biased toward the second arm 16A. As shown in FIG. 8, the tabs 50A, 52A may be squeezed (as indicated by the arrows) so that the first arm 14A, which is biased away from the second arm 16A, is pushed toward arms 16A, 17A, 19A so that the tip 18A (shown in FIG. 7) engages the object 12A. The force that biases arm 14A and arm 16A apart from one another may be relatively weaker than the force that biases the second arm 16A and the third and fourth arms 17A, 19A toward one another. When the tabs 50A, 52A are squeezed with sufficient force, the tab 52A overcomes the force biasing the third and fourth arms 17A, 19A toward the second arm 16A so that the third and fourth arms 17A, 19A shift away from the object 12A, and the object 12A is gripped by the second arm 16A and the tip 18A of the first arm 14A, as depicted in FIGS. 9A and 9B. Turning to FIGS. 10A and 10B, the tab 50A may be pressed longitudinally relative to the arm 14A (as indicated by the arrow) so that the tip 18A rotates the object 12A. The squeezing force on the tabs 50A, 52A may be released so that the third and fourth arms 17A, 19A and the second arm 16A re-engage the object 12A at its new orientation due to the biasing force pulling the third and fourth arms 17A, 19A and arm 16A together.

Figure 11:
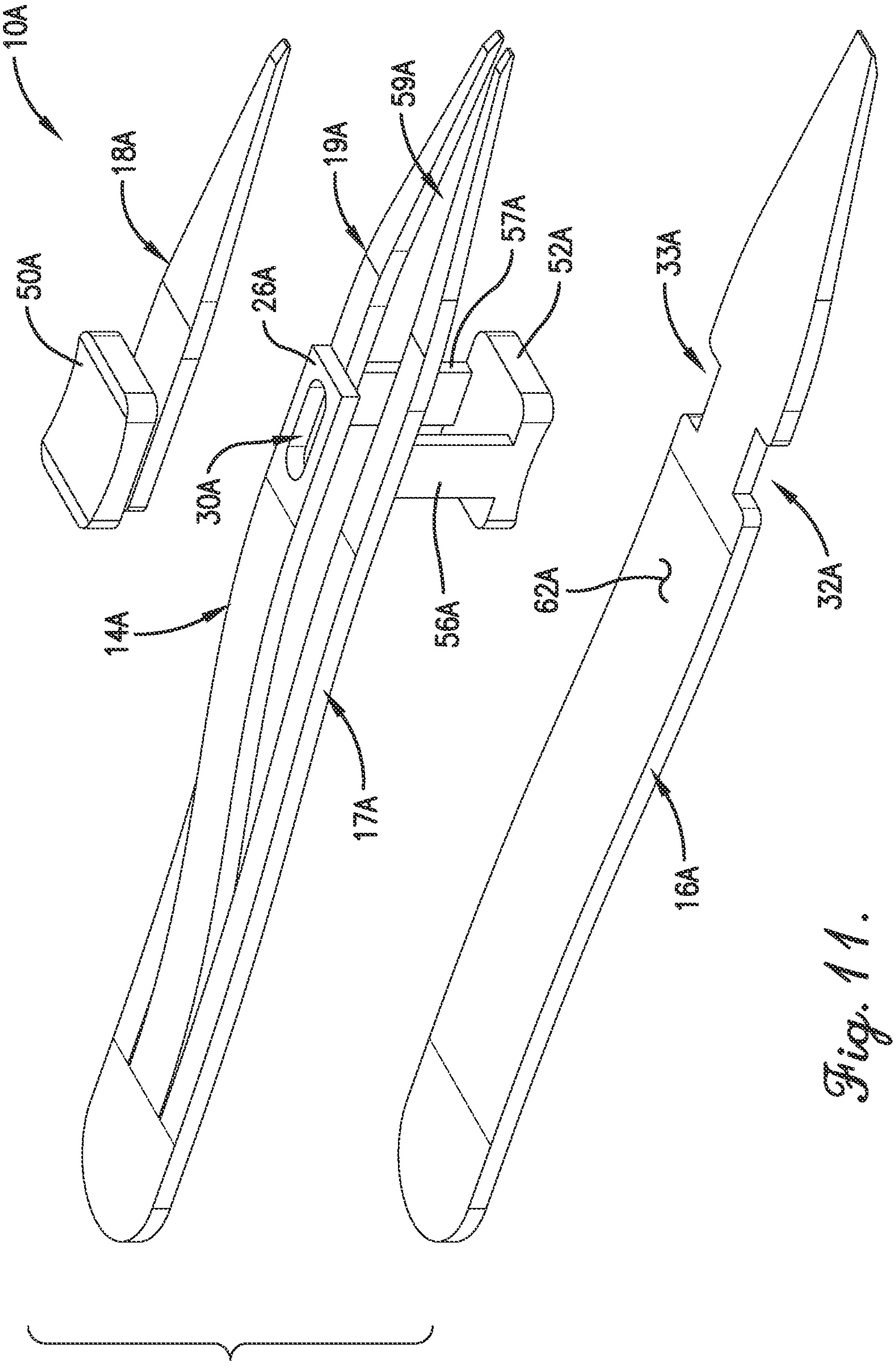
FIG. 11 is an elevated exploded view of the gripping device of FIG. 5.
Figure 12:
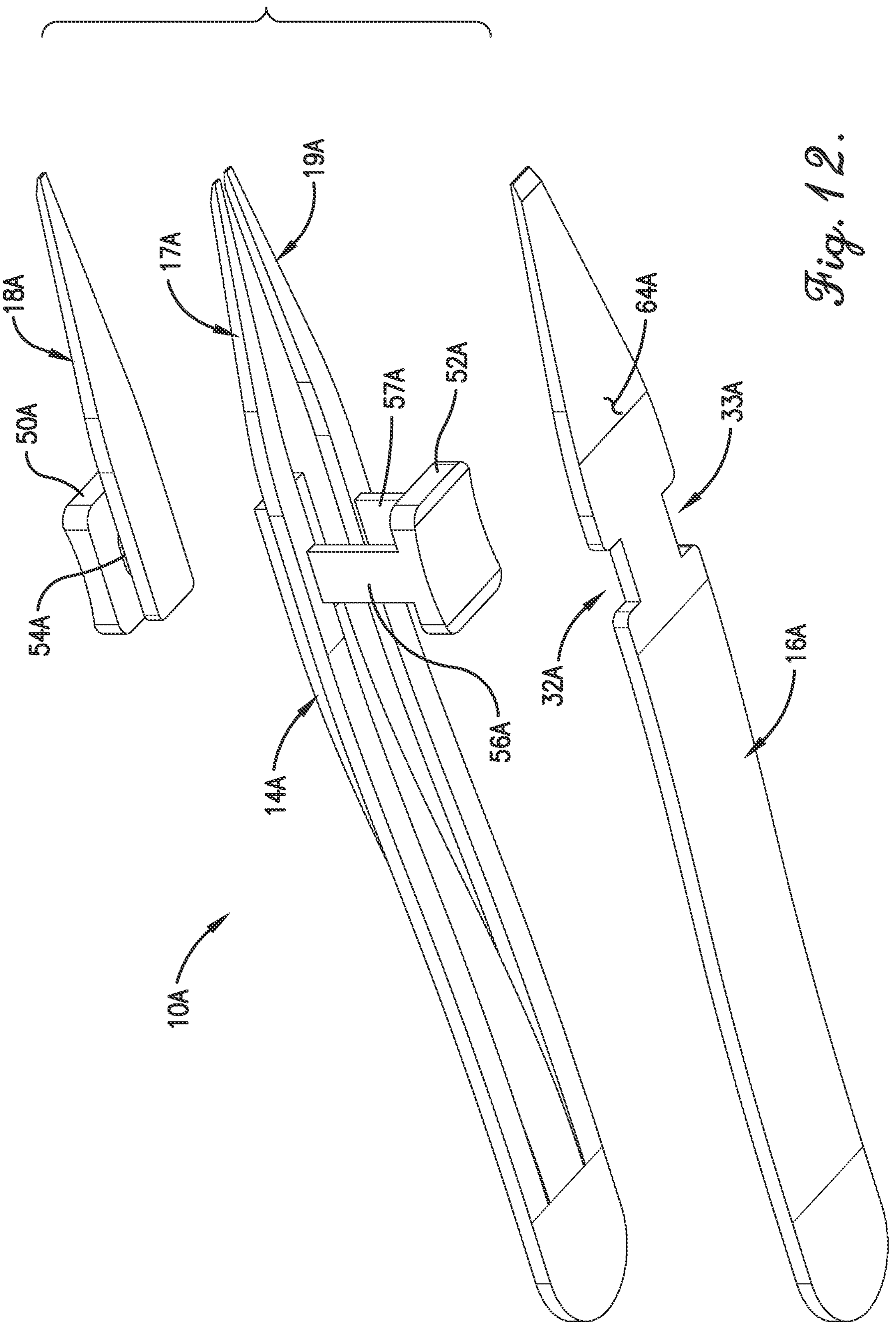
FIG. 12 is lowered exploded view of the gripping device of FIG. 5.

Turning to FIGS. 11 and 12, exploded views of the gripping device 10A are depicted. As shown, the tip 18A is shiftably connected to the distal end 26A of the first arm 14A. The tip 18A includes the protruding member 54A (depicted in FIG. 12) that extends through the slot 30A of the first arm 14A and connects to the tab 50A. The third and fourth arms 17A, 19A define a slot 59A through which the first arm 14A and the tip 18A can shift. The second arm 16A includes an inner surface 62A facing the first arm 14A and an outer surface 64A (depicted in FIG. 12) opposite the inner surface 62A. The tab 52A is positioned on the outer surface 64A side of the second arm 16A (as depicted in FIGS. 5-10B), and the protruding members 56A, 57A extend from the tab 52A through the slots 32A, 33A and past the inner surface 62A to the third and fourth arms 17A, 19A.

Additional Considerations

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth in any subsequent regular utility patent application. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim (s).

Although the invention has been described with reference to the embodiments illustrated in the attached drawing figures, it is noted that equivalents may be employed and substitutions made herein without departing from the scope of the invention as recited in the claims.

The invention claimed is:

1. A gripping device comprising:

a first arm having a proximal end and a distal end;

a second arm opposing the first arm, the distal end of the first arm being operable to shift toward the second arm;

a third arm opposing the second arm; and a tip shiftably coupled to the distal end of the first arm so that the tip is operable to longitudinally shift between a retracted position in which the tip is relatively closer to the proximal end of the first arm and an extended position in which the tip is relatively farther from the proximal end of the first arm.

2. The gripping device of claim 1, further comprising a fourth arm opposing the second arm and spaced laterally from the third arm to define a slot through which the first arm can pass toward the second arm.

3. The gripping device of claim 1, wherein the first arm is biased toward a first position at which the distal end of the first arm is at a first distance from the second arm, the third arm includes a proximal end proximate to the proximal end of the first arm and a distal end, the third arm is biased toward a second position at which the distal end of the third arm is at a second distance from the second arm, and the second distance is shorter than the first distance.

4. The gripping device of claim 3, wherein the second arm includes an inner surface facing the first arm and an outer surface opposite the inner surface, further comprising a protruding member extending from the third arm past the outer surface of the second arm.

5. The gripping device of claim 4, wherein the first arm is biased at a first threshold force, and the third arm is biased at a second threshold force that is greater than the first threshold force.

6. A method of manipulating an object with a gripping device, comprising:

gripping the object between a first tip and a second tip of the gripping device, the gripping device comprising:

a first arm having a first proximal end and a first distal end, the first tip fixed to or shiftably coupled to the first distal end of the first arm, a second arm opposing at least a portion of the first arm and having a second proximal end and a second distal end operable to shift toward the first arm, and the second tip shiftably coupled to the distal end of the second arm so that the second tip is operable to longitudinally shift between a retracted position in which the second tip is relatively closer to the second proximal end of the second arm and an extended position in which the second tip is relatively farther from the second proximal end of the second arm; and longitudinally shifting the second tip relative to the second arm while the object remains gripped between the first tip and the second tip such that the object rotates.

7. The method of claim 6, wherein the first tip is shiftably coupled to the first distal end of the first arm so that the first tip is operable to longitudinally shift relative to the first arm.

8. The method of claim 6, further comprising longitudinally shifting the first tip relative to the first arm independently in a different direction than the longitudinally shifting of the second tip while the object remains gripped between the first tip and the second tip.

9. The method of claim 6, wherein gripping the object comprises squeezing the first arm towards the second arm.

10. The method of claim 6, wherein the second distal end of the second arm includes a slot, and the second tip comprises a protruding member that extends into the slot of the second distal end of the second arm.

11. The method of claim 10, wherein the second tip includes a tab that maintains the protruding member within the slot.

12. The method of claim of claim 11, wherein the second distal end of the second arm includes an outer surface, the protruding member extends through the slot to the outer surface, and the tab includes a bottom surface that faces the outer surface of the second distal end of the second arm and a top surface opposite to the bottom surface that faces away from the outer surface of the second distal end of the second arm.

13. The method of claim 12, wherein the top surface of the tab comprises a gripping structure.

14. The method of claim 13, wherein the gripping structure comprises a concave surface.

15. The method of claim 6, wherein the second arm is biased toward a position at a distance from the first arm.

16. The method of claim 15, wherein the first proximal end of the first arm is attached to the second proximal end of the second arm.

17. The method of claim 6, wherein the first distal end of the first arm includes a slot, and the first tip comprises a protruding member that extends into the slot of the first distal end of the first arm and a tab that maintains the protruding member within the slot.

18. The method of claim 17, wherein the first distal end of the first arm includes an outer surface, the protruding member extends through the slot to the outer surface, and the tab includes a bottom surface that faces the outer surface of the first distal end of the first arm and a top surface opposite to the bottom surface that faces away from the outer surface of the first distal end of the first arm.

19. The method of claim 18, wherein the top surface of the tab comprises a gripping structure.

20. The method of claim 19, wherein the gripping structure comprises a concave surface.

* * * * *